US012593283B2

(12) United States Patent　　　　(10) Patent No.:　　US 12,593,283 B2
Ko et al.　　　　　　　　　　　　　(45) Date of Patent:　　　Mar. 31, 2026

(54) NON-INFRASTRUCTURE ULTRA-WIDEBAND WIRELESS POSITIONING METHOD AND SYSTEM USING LATENCY COMMUNICATION AND OVERHEAR

(71) Applicant: AJOU UNIVERSITY INDUSTRY-ACADEMIC COOPERATION FOUNDATION, Suwon-si (KR)

(72) Inventors: Young Bae Ko, Suwon-si (KR); Jin Su Kim, Goryeong-gun (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 343 days.

(21) Appl. No.: 18/421,961

(22) Filed: Jan. 24, 2024

(65) Prior Publication Data

US 2024/0259949 A1　　Aug. 1, 2024

(30) Foreign Application Priority Data

Jan. 26, 2023　　(KR) ......................... 10-2023-0009990

(51) Int. Cl.
*H04W 52/02*　　　　(2009.01)
*H04L 5/00*　　　　　(2006.01)
*H04W 48/04*　　　　(2009.01)

(52) U.S. Cl.
CPC ....... *H04W 52/0277* (2013.01); *H04L 5/0048* (2013.01); *H04W 48/04* (2013.01)

(58) Field of Classification Search
CPC ..... G01S 1/00; G01S 3/00; G01S 5/00; G01S 5/0242; G01S 5/0249; G01S 5/06;
(Continued)

(56) References Cited

U.S. PATENT DOCUMENTS

| | | | |
|---|---|---|---|
| 2002/0155845 A1 | 10/2002 | Martorana | |
| 2003/0222819 A1* | 12/2003 | Karr ......................... | G01S 5/021 |
| | | | 342/457 |

(Continued)

FOREIGN PATENT DOCUMENTS

| | | | | |
|---|---|---|---|---|
| KR | 10-2017-0105795 A | 9/2017 | | |
| WO | WO-2017196584 A1 * | 11/2017 | ............... | G01S 5/14 |
| WO | WO-2023200686 A2 * | 10/2023 | ............... | G01S 5/12 |

*Primary Examiner* — Thomas R Cairns

(57) ABSTRACT

Disclosed herein non-infrastructure ultra-wideband wireless positioning method and system using latency communication and overhear. The method includes: receiving a ranging message transmitted from other active devices; measuring a location of an active device by using data obtained from the ranging message; checking a remaining amount of power of the active device and creating a ranging message by using the remaining amount of power of the active device and the obtained data; and transmitting the created ranging message to the other active devices. When a request of device change is received from a first passive device based on a remaining amount of power of a passive device overhearing the ranging message and the remaining amount of power of the active device, a response for changing the first passive device to an active device is provided, and the active device itself changes from an active device to a passive device.

19 Claims, 6 Drawing Sheets

(58) Field of Classification Search

CPC ....... G01S 5/12; H04L 5/0048; H04L 5/0053; H04L 5/0091; H04W 48/04; H04W 52/0277; H04W 64/00; H04W 64/006

See application file for complete search history.

(56) References Cited

U.S. PATENT DOCUMENTS

| | | | |
|---|---|---|---|
| 2008/0224869 A1* | 9/2008 | Kaplan | G06K 7/10306 |
| | | | 340/572.1 |
| 2013/0030931 A1* | 1/2013 | Moshfeghi | H04B 5/73 |
| | | | 705/16 |
| 2014/0148196 A1* | 5/2014 | Bassan-Eskenazi | |
| | | | H04W 4/029 |
| | | | 455/456.1 |
| 2017/0135063 A1* | 5/2017 | Bartov | G01S 13/765 |
| 2017/0180938 A1* | 6/2017 | Smith | H04W 4/08 |
| 2017/0238136 A1* | 8/2017 | Smith | H04M 1/72457 |
| | | | 455/456.3 |
| 2018/0063680 A1* | 3/2018 | Bitra | H04W 4/027 |
| 2020/0314795 A1* | 10/2020 | Wakabayashi | H04W 64/00 |
| 2021/0058744 A1* | 2/2021 | Padaki | H04W 4/029 |
| 2021/0400427 A1* | 12/2021 | Burowski | H04W 74/0808 |
| 2022/0317236 A1* | 10/2022 | Dongare | G01S 5/14 |
| 2022/0385333 A1* | 12/2022 | Yoon | G01S 13/76 |
| 2023/0309144 A1* | 9/2023 | Zhu | H04W 56/0015 |
| 2025/0039828 A1* | 1/2025 | Manolakos | H04W 8/22 |

* cited by examiner

| $X_i$ | $T_{i-1}$ | $RxM_0$ | $RxM_1$ | x | y | E | $X_{Change}$ |
|---|---|---|---|---|---|---|---|

1

NON-INFRASTRUCTURE ULTRA-WIDEBAND WIRELESS POSITIONING METHOD AND SYSTEM USING LATENCY COMMUNICATION AND OVERHEAR

CROSS REFERENCE TO RELATED APPLICATION

The present application claims priority to a Korean patent application 10-2023-0009990, filed Jan. 26, 2023, the entire contents of which are incorporated herein for all purposes by this reference.

BACKGROUND OF THE INVENTION

Field of the Invention

The present disclosure relates to a non-infrastructure ultra-wideband (UWB) wireless positioning technology, and more particularly, to a UWB wireless positioning method and system capable of measuring locations of an active device and a passive device respectively by using latency communication and overhearing in a non-infrastructure UWB wireless communication environment.

Description of the Related Art

As an existing GPS-based position measurement system uses wireless signals sent from a satellite, it is suitable for outdoor use and provides only location information, not communication and network functions Accordingly, because no GPS is available in indoor space, a space positioning system using such networks as Wi-Fi, Bluetooth, and RFID is being used instead of the GPS technology.

However, an existing alternative system has an error in meters. A positioning system using UWB signals is an alternative to solving the occurrence of such an error. A positioning system using UWB signals uses a ranging technology that measures a distance between electronic devices by using the UWB for medium access control (MAC).

Being a wireless communication technology using not a radio carrier but a very wide frequency band over several GHz as a baseband, the UWB is suitable for a positioning system in virtue of high security, low power, and accurate position recognition (in centimeters).

SUMMARY

The present disclosure is technically directed to providing a UWB wireless positioning method and system capable of measuring locations of an active device and a passive device respectively by using latency communication and overhearing in a non-infrastructure UWB wireless communication environment.

The present disclosure is technically directed to providing a UWB wireless positioning method and system that are capable of enhancing power efficiency of a system by reducing a number of communications in mutual positioning in a non-infrastructure situation and of operating more devices simultaneously.

The technical problems solved by the present disclosure are not limited to the above technical problems and other technical problems which are not described herein will be clearly understood by a person having ordinary skill in the technical field, to which the present disclosure belongs, from the following description.

According to the present disclosure, there is provided a non-infrastructure ultra-wideband (UWB) wireless positioning method, the method including: receiving a ranging message transmitted from other active devices; obtaining data included in the ranging message and measuring a location of an active device by using the obtained data; checking a remaining amount of power of the active device and creating a ranging message by using the remaining amount of power of the active device and the obtained data; and transmitting the created ranging message to the other active devices at a preset transmission time. When a request of device change is received from a first passive device based on a remaining amount of power of at least one passive device overhearing the ranging message and the remaining amount of power of the active device, a response for changing the first passive device to an active device is provided, and the active device itself changes from an active device to a passive device.

According to the embodiment of the present disclosure in the method, the creating of the ranging message may create the ranging message including an address of the first passive device so that the first passive device changes to an active, when the request of device change is received first from the first passive device.

According to the embodiment of the present disclosure in the method, the measuring of the location of the active device may measure the location by additionally considering a transmission order of the ranging message, which is preset for the other active devices and the active device.

According to the embodiment of the present disclosure in the method, the measuring of the location of the active device may measure the location of the active device by obtaining an address of each of the other active devices, a reception time of the ranging message, and coordinate information of each of the other active devices and by using distance information obtained through ranging with the other active devices and the coordinate information of each of the other active devices.

According to the embodiment of the present disclosure in the method, the receiving may receive the ranging message that is transmitted at a transmission time that is preset in each of the other active devices.

According to the embodiment of the present disclosure in the method, each of the other active devices and the active device may include a device capable of moving.

According to the embodiment of the present disclosure in the method, the measuring of the location of the active device may measure the location by using the obtained data of the ranging message that is received through a latency communication technique and a process of ranging with the other active devices.

According to another embodiment of the present disclosure, there is provided a non-infrastructure ultra-wideband (UWB) wireless positioning method, the method including: obtaining a ranging message transmitted from each of active devices by using an overhear function; obtaining positioning necessary data for positioning included in the ranging message; measuring a location of a passive device by using the positioning necessary data; creating a message for changing the passive device to an active device, when a remaining amount of power of each of the active devices included in the ranging message and a remaining amount of power of the passive device are compared and a preset condition is satisfied; and transmitting the created message to the active devices. When the created message is transmitted to the active devices, one active device of the active devices changes to a passive device, and the passive device changes from a passive device to an active device.

According to the embodiment of the present disclosure in the method, the measuring of the location of the passive device may measure the location of the passive device based on a location of each of the active devices by using a time difference of arrival (TDoA) method.

According to the embodiment of the present disclosure in the method, the creating of the message may create the message including an address of the one active device, when there is the one active device with a remaining amount of power that is larger than the remaining amount of power of the passive device by a predetermined amount or more.

According to the embodiment of the present disclosure in the method, the creating of the message may create the message including an address of an active device with a largest remaining amount of power, when there are a plurality of active devices with a remaining amount of power that is larger than the remaining amount of power of the passive device by a predetermined amount or more.

According to the embodiment of the present disclosure in the method, the creating of the message may create the message including an address and a priority of each of a plurality of active devices, when the plurality of active devices have a remaining amount of power that is larger than the remaining amount of power of the passive device by a predetermined amount or more.

According to other embodiment of the present disclosure, there is provided a non-infrastructure ultra-wideband (UWB) wireless positioning system, the system including: active devices that measure their locations through latency communication and a ranging process; and at least one passive device that obtains a ranging message transmitted from each of the active devices by overhearing and measures its own location based on positioning necessary data for positioning included in the ranging message. The passive device compares a remaining amount of power of each of the active devices included in the ranging message and its remaining amount of power of the passive device and, when a preset condition is satisfied, creates a message for changing to an active device and transmits the message to the active devices, so that one active device of the active devices changes to a passive device, and the passive device changes from a passive device to an active device.

According to the embodiment of the present disclosure in the system, each of the active devices may be configured to: receive the ranging message transmitted from other active devices, obtain data included in the ranging message, and measure its location by using the obtained data.

According to the embodiment of the present disclosure in the system, the each of the active devices may measure its location by obtaining an address of each of the other active devices, a reception time of the ranging message, and coordinate information of each of the other active devices, and by using distance information obtained through ranging with the other active devices and the coordinate information of each of the other active devices.

According to the embodiment of the present disclosure in the system, the passive device may measure its location based on a location of each of the active devices by using a time difference of arrival (TDoA) method.

According to the embodiment of the present disclosure in the system, the passive device may create the message including an address of the one active device, when there is the one active device with a remaining amount of power that is larger than the remaining amount of power of the passive device by a predetermined amount or more.

According to the embodiment of the present disclosure in the system, the passive device may create the message including an address of an active device with a largest remaining amount of power, when there are a plurality of active devices with a remaining amount of power that is larger than the remaining amount of power of the passive device by a predetermined amount or more.

According to the embodiment of the present disclosure in the system, the passive device may create the message including an address and a priority of each of a plurality of active devices, when the plurality of active devices have a remaining amount of power that is larger than the remaining amount of power of the passive device by a predetermined amount or more.

The features briefly summarized above for this disclosure are only exemplary aspects of the detailed description of the disclosure which follow, and are not intended to limit the scope of the disclosure.

According to the present disclosure, it is possible to provide a UWB wireless positioning method and system capable of measuring locations of an active device and a passive device respectively by using latency communication and overhearing in a non-infrastructure UWB wireless communication environment.

According to the present disclosure, it is possible to provide a UWB wireless positioning method and system that are capable of enhancing power efficiency of a system by reducing a number of communications in mutual positioning in a non-infrastructure situation and of operating more devices simultaneously.

It will be appreciated by persons skilled in the art that that the effects that can be achieved through the present disclosure are not limited to what has been particularly described hereinabove and other advantages not mentioned herein will be clearly understood from the detailed description below.

DETAILED DESCRIPTION OF THE INVENTION

Figure 1:
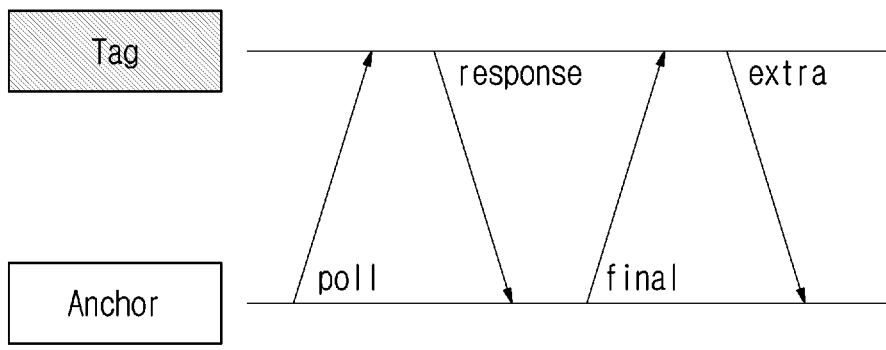
FIG. 1 shows an example diagram for explaining a double sided two way ranging (DS-TWR) technique.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

Indoor positioning technology is a technology for searching for a terminal that moves in an indoor environment. An existing positioning technology is a technology that distinguishes an anchor device with a fixed location and a tag device, which has an unknown location and is to be positioned, and locates the tag device based on the location of the anchor device, and at least three anchor devices are needed to obtain two-dimensional location data, and at least four anchor devices are needed to obtain three-dimensional location data.

Distance information between devices is needed for positioning. Distance information may be obtained through ranging. Ranging calculates a distance between devices through a time-of-flight of a signal.

As a representative ranging technique, double sided two way ranging (DS-TWR) may measure a distance between a tag device and an anchor device through a communication process consisting of poll, response, final and extra, as illustrated in FIG. 1.

Figure 2:
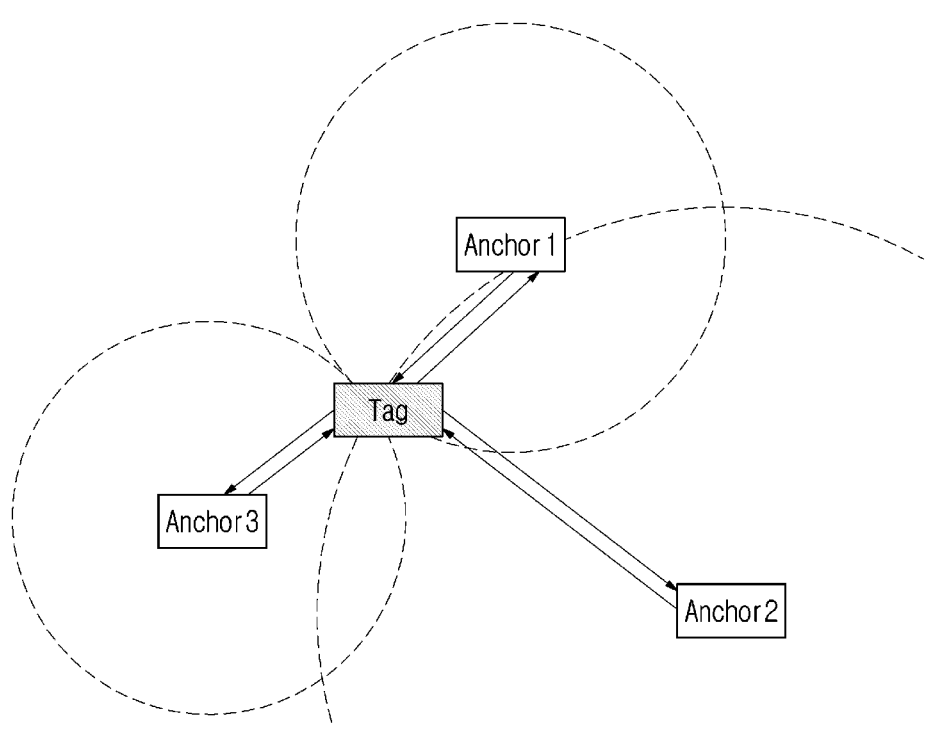
FIG. 2 shows an example diagram for explaining a positioning technique using a ToA technique.

A time of arrival (ToA) technique is a positioning method that uses a distance value between an anchor device and a tag device that is obtained through ranging such as DS-TWR, and as illustrated in FIG. 2, a method like trilateration may be used.

Figure 3:
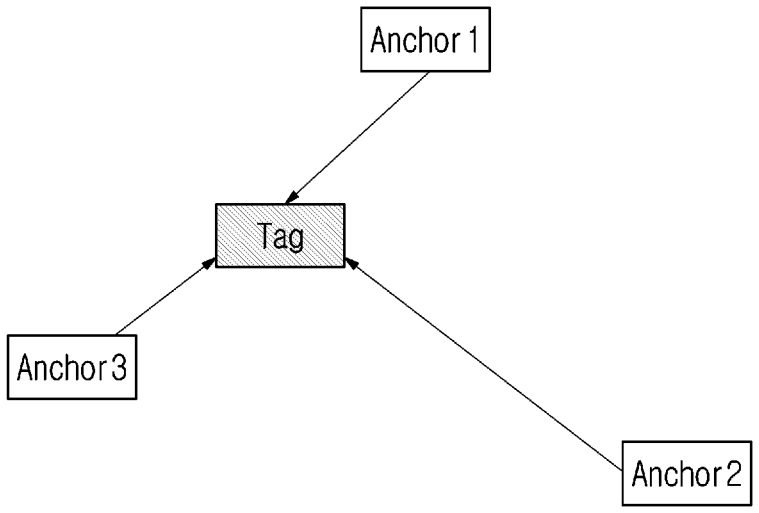
FIG. 3 shows an example diagram for explaining a positioning technique using a TDoA technique.

A time difference of arrival (TDoA) technique is a positioning method that uses, unlike ToA, a difference of communication arrival time between a plurality of anchors and a tag, and the anchors periodically transmit a signal in a predetermined order and the tag calculates a difference of arrival time of the signal and thus calculates an equation of hyperbola, thereby calculating a location of the tag. For example, as illustrated in FIG. 3, when three anchors, Anchor 1, Anchor 2, and Anchor 3 send signals to a tag, the signals are distinguished at the tag side, and a location of the tag may be measured by calculating a difference of arrival time among the signals transmitted from Anchor 1, Anchor 2, and Anchor 3.

A method using ToA requires four communications to measure a distance between a tag and an anchor. Accordingly, when locating a plurality of tags, communications required are as many as four times the number of the tags. Such a number of communications may cause a conflict of signals, affect a ranging success rate, and consequently make positioning accuracy problematic.

A method using TDoA does not affect positioning accuracy even when the number of tags is increased, because only anchors transmit signals and thus the number of communications required for positioning does not change despite an increase in the number of tags. Nevertheless, there still exists a problem in that it is an infrastructure-based technology.

A study, which has been recently introduced, tries to solve the scalability problem of ToA by modifying a DS-TWR ranging technique, delaying a response and thus performing a single communication with a plurality of devices. In case the method is used, all the devices, not distinguished between an anchor and a tag, send responses to a ranging message, which is received over a predetermined time, in a single message once. Through this message, even if the number of communicating devices increases, the number of communications required for positioning decreases, but as compared with a TDoA method, there are still many communications, and there is a problem in that communication is performed with locations of unnecessary devices.

Embodiments of the present disclosure are directed to reducing the number of communications required for positioning between devices (or apparatuses, equipments) by measuring locations of an active device and a passive device respectively through latency communication and overhearing in a non-infrastructure wireless communication environment and thus to enhancing power efficiency of a system and operating more devices simultaneously.

According to an embodiment, each active device may relatively measure its own location based on locations of other respective active devices through a ranging process, and each passive device may measure its own location based on a location of each active device by using a TDoA method.

A method, a system, and a device according to embodiments of the present disclosure will be described below with reference to FIG. 4 to FIG. 8.

Figure 4:
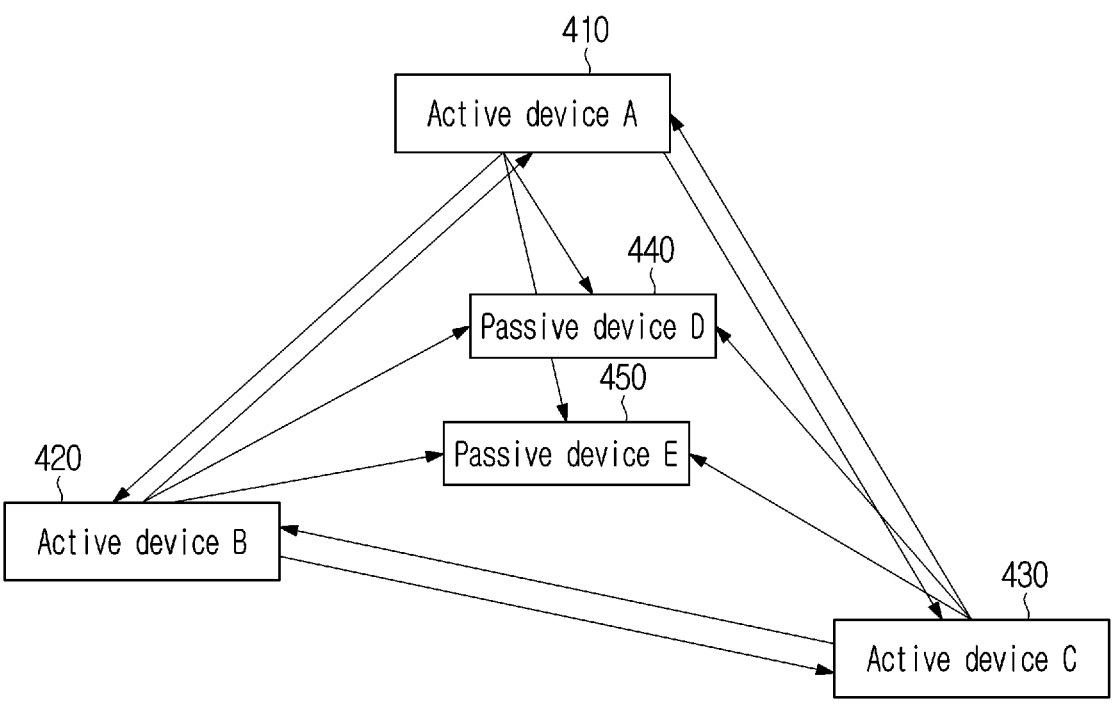
FIG. 4 shows a configuration of a UWB wireless positioning system according to one embodiment of the present disclosure.

FIG. 4 shows a configuration of a UWB wireless positioning system according to one embodiment of the present disclosure, and it shows an example of a non-infrastructure UWB wireless positioning system composed of three active devices and two passive devices.

As illustrated in FIG. 4, active devices 410, 420 and 430 measure their own locations through latency communication and a ranging process.

According to an embodiment, each of the active devices 410, 420 and 430 may receive a ranging message transmitted from other active devices by latency communication, obtain data in the ranging message, and measure its own location by using the obtained data.

Furthermore, each of the active devices 410, 420 and 430 may check its remaining amount of power, create a ranging message by the remaining amount of power and data obtained through the received ranging message, and then transmit the created ranging message to other active devices at a preset transmission time, so that its address and the remaining amount of power may be included in the ranging message, and the ranging message may be transmitted at the preset transmission time (or transmission point) by latency communication.

Thus, a ranging message transmitted from each of the active devices 410, 420 and 430 may include a reception time of a ranging message transmitted from other active devices and include coordinate information of the active device and information on an address and a remaining amount of power of the active device.

When such active devices 410, 420 and 430 receive a ranging message for requesting a device change from the passive devices 440 and 450, an active device with an active device address included in the ranging message provides a ranging message including its address as a response, and thus the active device changes to a passive device, and a passive device requesting the device change changes to an active device. Herein, the passive devices 440 and 450 may request a device change through a comparison between respective amounts of power of the active devices 410, 420 and 430 and their remaining amounts of power, which will be described in detail in FIG. 8.

The passive devices 440 and 450 obtain a ranging message transmitted from each of the active devices 410, 420 and 430 through overhearing and measure their own locations based on positioning necessary data for positioning included in the ranging message.

Herein, the positioning necessary data may include coordinate information (or location information) of each of the active devices 410, 420 and 430, a transmission time of the ranging message, and a reception time of each ranging message.

Each of the passive devices 440 and 450 may measure its own location based on a location of each of the active devices 410, 420 and 430 by using a TDoA method. That is, each of the passive devices 440 and 450 may apply a TDoA technique using a time difference of overheard signals and thus calculate (or measure) its own location even if it is not a device that performs communication.

Unlike other communications, UWB has power consumption of a transmission device, for example, power consumption of an active device less than power consumption of a reception device, for example, a passive device. Accordingly, when the communication proceeds, the power consumption of a passive device increases faster than the power consumption of an active device, and the power of reception devices is exhausted first so that some systems may be paralyzed. To solve this problem, in the embodiments of the present disclosure, a remaining amount of power of a passive device is compared with a remaining amount of power of each of the active devices 410, 420 and 430, and if a preset condition is satisfied, the passive device changes to an active device, and an active device, for which the passive device requests a device change, changes to a passive device.

Specifically, the passive devices 440 and 450 may create a ranging message including an address of an active device, for which a device change is requested, and transmit the ranging message to the active devices 410, 420 and 430, and thus an active device, which corresponds to the address of the ranging message, may transmit a responding ranging message including an address of a corresponding passive device, so that the passive device may change to an active device and the corresponding active device may change to a passive device.

According to an embodiment, if there are a plurality of active devices having remaining amounts of power larger than remaining amounts of power of the passive devices 440 and 450 by a preset amount or more, the passive devices 440 and 450 may create a ranging message including an address of an active device with a largest remaining amount of power and transmit the ranging message to the active devices.

According to an embodiment, if there are a plurality of active devices having remaining amounts of power larger than remaining amounts of power of the passive devices 440 and 450 by a predetermined amount or more, the passive devices 440 and 450 may create a ranging message including an address of each of the plurality of active devices and a priority order thereof and transmit the ranging message to the active devices.

In an embodiment of the present disclosure, the active devices 410, 420 and 430 and the passive devices 440 and 450 may be devices capable of moving their locations, not devices fixed at specific locations.

An operation in an active device will be described with reference to FIG. 5 to FIG. 7, and an operation in a passive device will be described with reference to FIG. 8.

Figure 5:
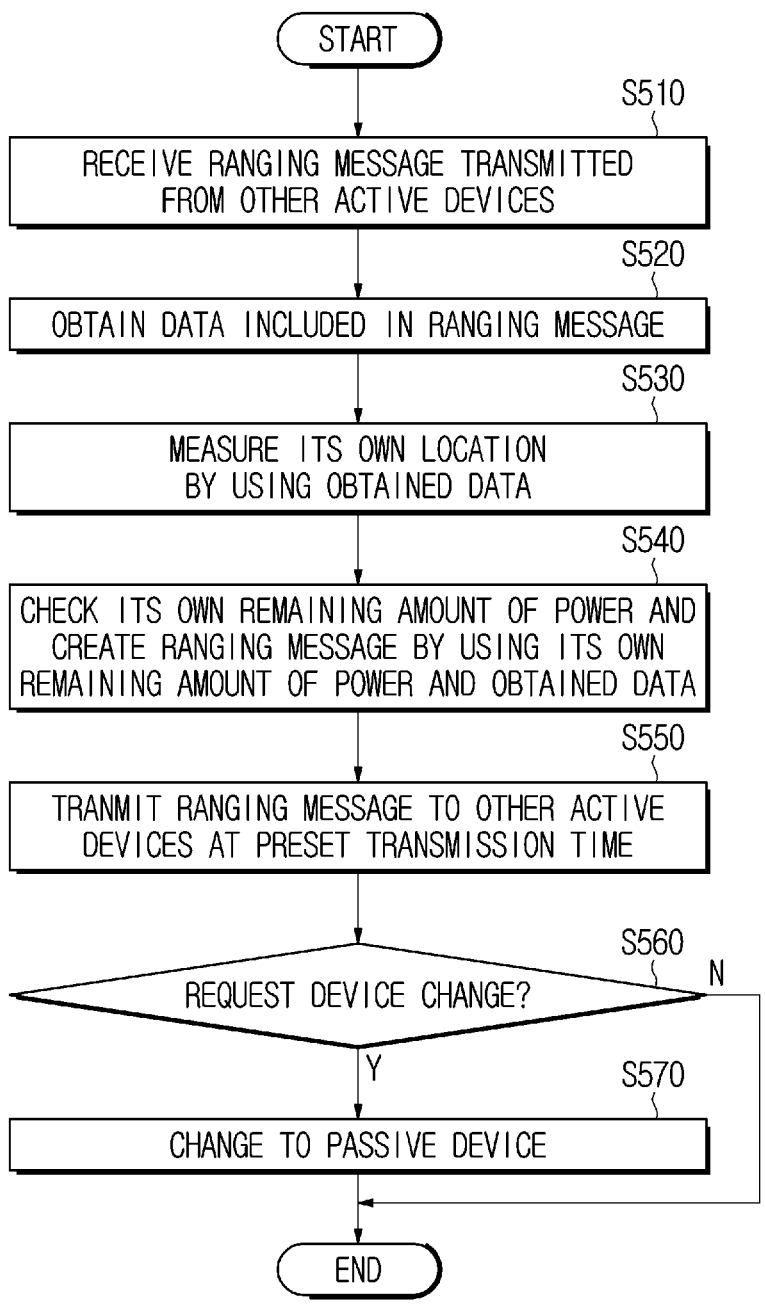
FIG. 5 shows an operation flowchart for a UWB wireless positioning method according to another embodiment of the present disclosure.

FIG. 5 shows an operation flowchart for a UWB wireless positioning method according to another embodiment of the present disclosure, and it shows an operation flowchart in an active device.

Referring to FIG. 5, in a non-infrastructure UWB wireless positioning method in an active device, a ranging message is received from other active devices by a latency communication technique, and data in the ranging message is obtained (S510 and S520).

Herein, because the ranging message includes an address, location information or coordinate information, a remaining amount of power of an active device transmitting the ranging message, and if the ranging message is received from another active device, a reception time of the ranging message, an active device receiving the ranging message may store a reception time for receiving the ranging message, an address and coordinate information of an active device transmitting the ranging message, and the like. Such a ranging message may be created and transmitted in a predetermined order for a predetermined time through a latency communication technique. For example, respective active devices may transmit ranging messages at a preset message transmission time, and another device may receive the ranging messages that are transmitted in a preset transmission order. In addition, the active device may transmit a ranging message by including every response to the other active devices therein, and this may be performed by a latency communication technique.

When the data included in the ranging message is obtained or collected at step S520, the active device measures its own location by using the obtained data (S530).

According to an embodiment, at step S530, the active device may measure its own location by using the obtained data of the ranging message that is received through a latency communication technique and a ranging process with other active devices. Herein, at step S530, the active device may measure its own location by considering a transmission order of ranging messages that is preset for other devices and itself.

According to an embodiment, at step S530, the active device may obtain, from the ranging message, an address of each of other active devices, a reception time of the ranging message, and coordinate information of each of the other devices, and measure its own location based on the coordinate information of each of the other devices by using distance information obtained through ranging with the other devices and the coordinate information of each of the other devices.

According to an embodiment, at step S530, the active device may obtain its own location through a time of flight (ToF) by using distance information that is obtained by ranging that is performed with other active devices. Herein, a coordinate is set according to its transmission order, and when first in the transmission order, the coordinate is set to the origin (0, 0), when second in the transmission order, the coordinate is set to a point $(+x_1, 0)$ on the x-axis with a distance from the original being an x-axis length, when third in the transmission order, a coordinate $(x_2, y_2)$ is calculated by calculating Gaussian distances from locations of two active devices, so that coordinate information of a corresponding active device may be set. As described above, each of active devices may measure or set location information by reflecting a transmission order of ranging message, an active device in a second transmission order may measure its own location based on coordinate information from the origin that is calculated through coordinate information and a distance value of the active device in the first transmission order, and an active device in a third transmission order may measure its own location by calculating coordinate information based on the coordinate information and distance value of the first active device and the coordinate information and a distance value of the second active device.

When the active device measure its own location through step S530, the active device checks its remaining amount of power, create a ranging message by using its remaining amount of power and the data obtained at step S520, and transmit the created ranging message to other active devices according to a preset transmission time or a preset transmission order (S540, S550).

In a non-infrastructure UWB system of the present disclosure, because an active device alone transmits a ranging message, while all passive devices receive the message, the passive devices have a greater amount of power consumption. Accordingly, as the system is maintained for a long time, the power of the passive devices may be exhausted first so that a part of the system may be paralyzed. Accordingly, it is necessary to check a remaining amount of power of a device and to change an active device to a passive device, and a method and a system according to an embodiment of the present disclosure may provide a criterion for a passive device to notify its remaining amount of power to neighbor devices and thus to change to an active device.

For example, at step S540, the active device may create and prepare to transmit a ranging message including its own address, an address of another active device stored therein, a reception time of a ranging message received from another active device, and its own remaining amount of power. In an embodiment, the ranging message may be configured with the fields illustrated in FIG. 7. As illustrated in FIG. 7, a filed $X_i$ of the ranging message means a transmission message sequence number, $T_{x-i}$ means a previous $X_{i-1}$ message transmission time (or transmission point), and $R_x M$ means reception times of ranging message received from other active devices. Herein, the reception times of the ranging messages may be input sequentially in order of reception. In addition, x and y may mean its own coordinate information, that is, coordinate information of an active device that will transmit a ranging message, and E may mean its remaining amount of power. $X_{change}$ means an address of a device, which will change to an active device instead, and this field may input an address of a passive device that requests a device change, when there is a ranging message for requesting a device change to its address (this ranging message is transmitted by the passive device requesting the device change). According to an embodiment, $X_{change}$ may input an address of a passive device that transmits a message first, when there are a plurality of ranging messages for requesting a device change to their addresses.

Figures 6, 7:
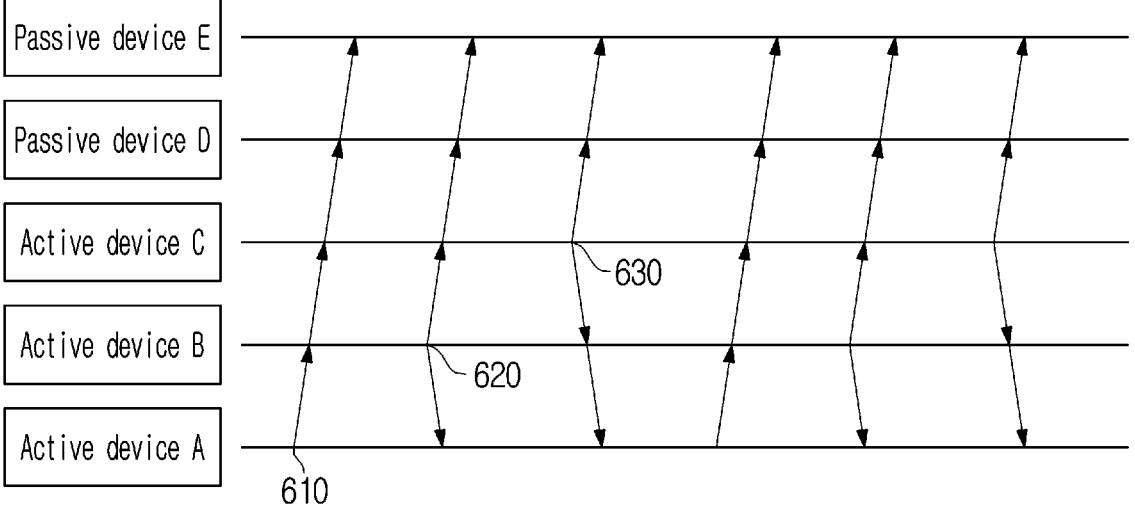
FIG. 6 shows an example diagram for explaining a latency communication method used in active devices of FIG. 4.
FIG. 7 shows an example diagram for explaining a ranging message created in a device.

When a ranging message is transmitted to other active devices at step S550 and a ranging message for request a device change is received from a passive device, a corresponding active device changes to a passive device and transmits an address of the passive device requesting the device change in the ranging message input in the field $X_{change}$ of FIG. 7, the passive device of the address input in the field $X_{change}$ changes to an active device (S560 and S570).

This method of the present disclosure will be described in further detail below using FIG. 6.

For example, as illustrated in FIG. 6, in case an active device A, an active device B, and an active device C transmit a ranging message in a transmission order by a latency communication technique, the active device A sets (or measures) its own location as an origin, creates a ranging message including an address of the active device A and its remaining amount of power, and transmits the ranging message to the active device B and the active device C at a preset first transmission point (or transmission time) 610. When receiving the ranging message transmitted from the active device A, the active device B and the active device C obtain data included in the ranging message and store information thereon. Likewise, a passive device D and a passive device E may obtain the ranging message transmitted from the active device A by using an overhear function and store information thereon.

In a next transmission order, the active device B stores the address and coordinate information of the active device A and a reception time of the ranging message received from the active device A and sets its coordinate information through a distance value from the active device A, which is calculated through the coordinate information (origin) of the active device A and ranging, thereby measuring its own location. In addition, the active device B creates a ranging message including the reception time of the ranging message received from the active device A, its own coordinate information and its own remaining amount of power and transmits the ranging message to the active device B and the active device C at a preset second transmission point 620. When receiving the ranging message transmitted from the active device B, the active device A and the active device C obtain data included in the ranging message and store information thereon.

In a next transmission order, the active device C stores the address and coordinate information of the active device A, the reception time of the ranging message transmitted from the active device A, the address and coordinate information of the active device B and a reception time of the ranging message transmitted from the active device B, sets its own coordinate information through a distance value from the active device A, which is calculated through the coordinate information (origin) of the active device A and ranging, and a distance value from the active device B that is calculated through the coordinate information of the active device B and ranging, and thus measures its own location based on the coordinate information of the active device A and the coordinate information of the active device B. In addition, the active device C creates a ranging message including the reception time of the ranging message received from the active device A, the reception time of the ranging message received from the active device B, its own coordinate information and its own remaining amount of power and transmits the ranging message to the active device A and the active device B at a preset third transmission point 630. When receiving the ranging message transmitted from the active device B, the active device A and the active device C obtain data included in the ranging message and store information thereon.

As this process is performed periodically at a predetermined time interval, even if the locations of the active devices A, B and C are changed, a location of the active device B and a location of the active device C may be relatively measured based on a location of the active device A. Predetermined times for transmitting ranging messages from the active devices A, B and C may be defined before a corresponding system is operated or be set when a passive device changes to an active device.

Figure 8:
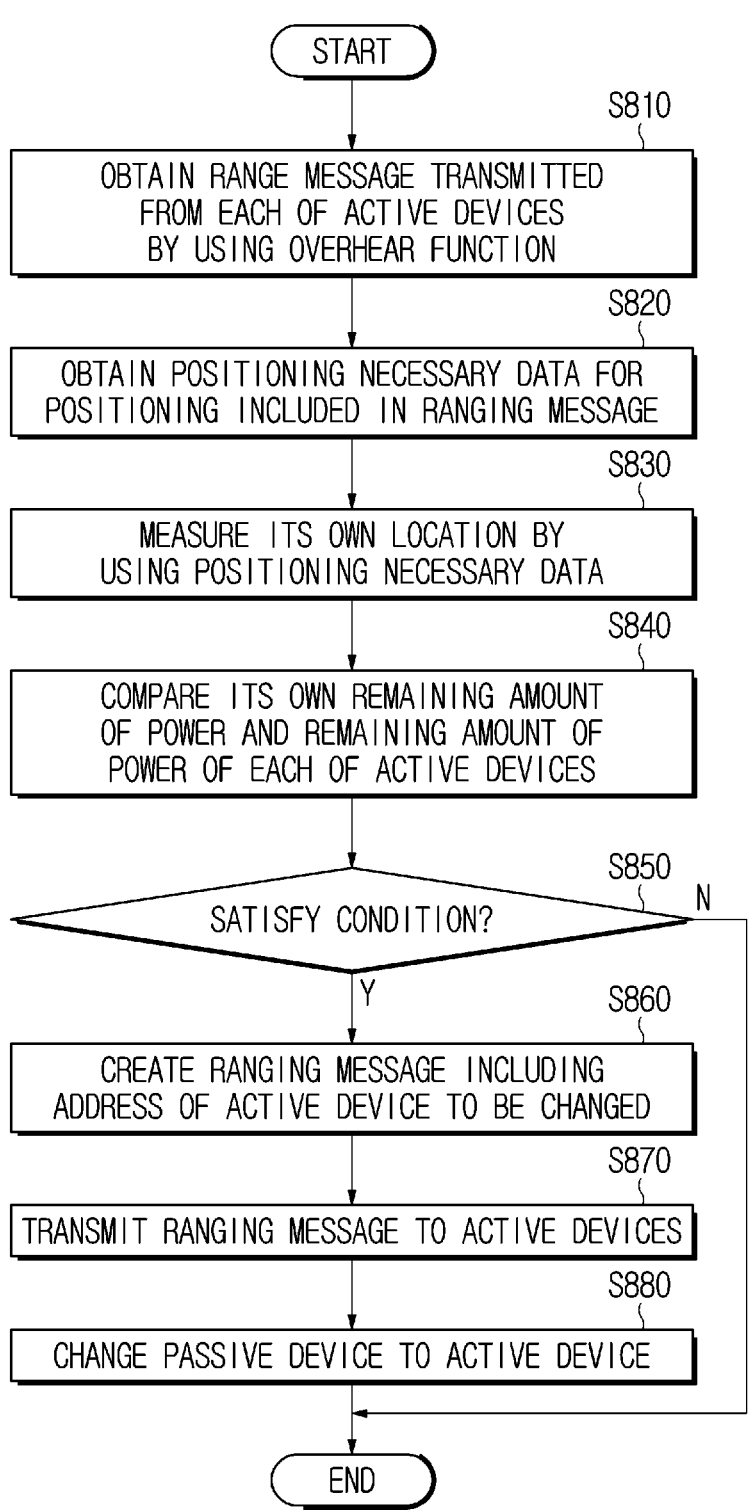
FIG. 8 shows an operation flowchart for a UWB wireless positioning method according to yet another embodiment of the present disclosure.

FIG. 8 shows an operation flowchart for a UWB wireless positioning method according to yet another embodiment of the present disclosure, and it shows an operation flowchart in a passive device.

Referring to FIG. 8, in a non-infrastructure UWB wireless positioning method in a passive device, a ranging message transmitted from each active device is obtained (or received) by using an overhear function, and positioning necessary data for positioning included in the ranging message is obtained (S810 and S820).

Herein, a passive device receiving the ranging message may store a reception time for receiving the ranging message, an address and coordinate information of an active device transmitting the ranging message, and the like.

For example, the passive device D and the passive device E, which are illustrated in FIG. 6, may obtain ranging messages transmitted from the active devices A, B and C respectively through overhearing and obtain positioning necessary data including coordinate information of each of the active devices A, B and C included in each of the ranging messages and an obtainment time of each ranging message.

When the positioning necessary data is obtained at step S820, the passive device measures its own location by using the obtained positioning necessary data (S830).

According to an embodiment, at step S830, the passive device may measure its own location based on a location of each active device by using a TDoA method. For example, each passive may measure its own location through the TDoA method that uses a time difference of arrival (time difference of obtainment) among ranging messages received from respective active devices and a location of each of the active devices.

When the passive device measures its own location at step S830, the passive device checks its remaining amount of power, compares its remaining amount of power and a remaining amount of power of each of the active devices included in a ranging message, and if a preset condition is satisfied, creates a ranging message including an address of an active device to be changed for changing the passive device to an active device, and transmits the created ranging message to the active devices (S840, S850, S860 and S870).

According to an embodiment, at step S850, if a remaining amount of power of an active device is larger than the remaining amount of power of the passive device by a predetermined amount or more, it may be determined that the condition is satisfied, or if the remaining amount of power of the passive device is less than ½ of the remaining amount of power of an active device, it may be determined that the condition is satisfied. Such a condition may be determined by a provider, which provides a technique of the present disclosure, or by a private person, and the condition may be different according to an environment and a situation.

According to an embodiment, the ranging message created at step S860 may include the same fields as those of FIG. 7, and an address of an active device to be changed may be input in Xchange.

According to an embodiment, at step S860, when there is any one active device satisfying the condition, a ranging message including an address of the any one active device may be created.

According to an embodiment, at step S860, when there are a plurality of active devices satisfying the condition, a ranging message including an address of an active device with a largest remaining amount of power may be created.

According to an embodiment, at step S860, when there are a plurality of active devices satisfying the condition, a ranging message including respective addresses and priorities of the plurality of active devices may be created. For example, a ranging message may be created to include a $X_{change1}$ field for highest priority, a $X_{change2}$ field for second highest priority, and the like in the $X_{change}$ field. Herein, an address of an active device with highest priority may be input in the $X_{change1}$ field, and an address of an active device with next highest priority may be input in the $X_{change2}$ field. In case a plurality of passive devices request to change to a same active device, only one passive device may change to the active device, and the remaining passive devices may repeatedly perform a process of creating a ranging message for requesting a device change through the above-described process. Such a priority order may remove the repetitive process and enable an active device with next priority to be immediately changed in role. Of course, in case an address of only one active device is input without a field of priority and a plurality of passive devices request a device change for the same active device, the device change may be performed between the active device and a passive device with a ranging message that the active device receives first, and the other passive devices, for which the device change has not been performed, may request a device change by performing again the process of comparing their remaining amounts of power and respective amounts of power of active devices and determining an active device to be changed and the process of creating a ranging message including an address of the determined active device.

When the ranging message for requesting the device change is transmitted at step S870 and then a ranging message for responding to the device change is received from an active device included in the ranging message, the passive device changes itself to an active device (S880). Of course, the active device, which transmits the ranging message for responding to the device change, changes its role to a passive device.

Such a request of device change from a passive device to an active device may be made at an interval of a predetermined time or be made based on a remaining amount of power in the passive device, and to prevent the device change from being performed too frequently, it is preferable that the request is made at an interval of a predetermined time.

Thus, a system and a method according to embodiments of the present disclosure may reduce the number of communications required for positioning between devices by measuring locations of an active device and a passive device respectively through latency communication and overhearing in a non-infrastructure wireless communication environment and thus enhance power efficiency of the system and operate more devices simultaneously.

If information on the transmission time and reception time of a ranging message is known for positioning, the positioning accuracy is not affected even when no immediate response is given. In virtue of this, the system and method according to embodiments of the present disclosure may reduce the number of communications for response by including necessary information in a single communication and also increase an operation time of the whole system by periodically changing a message transmission device (for example, active device).

Such active devices and passive devices may each be implemented as a UWB wireless positioning device.

Figure 9:
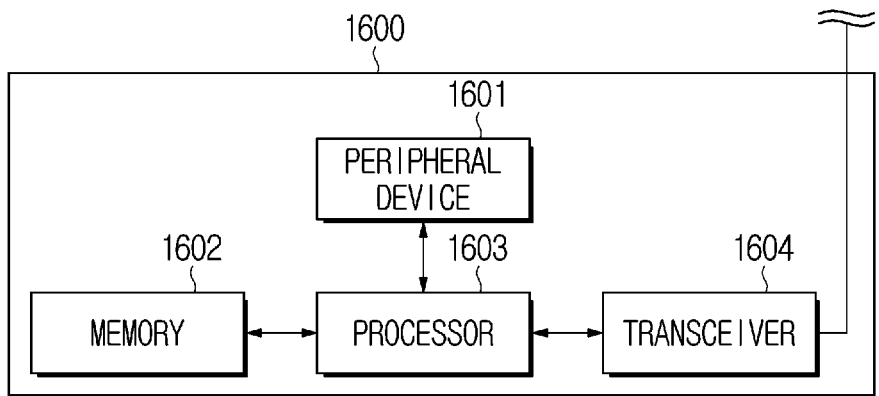
FIG. 9 is a view showing a configuration of a device to which a UWB wireless positioning device according to yet another embodiment of the present disclosure is applied.

FIG. 9 is a view showing a configuration of a device to which a UWB wireless positioning device according to yet another embodiment of the present disclosure is applied, and a UWB wireless positioning device may be an active device or a passive device.

For example, a UWB wireless positioning device according to yet another embodiment of the present disclosure may be a device 1600 of FIG. 9. Referring to FIG. 9, the device 1600 may include a memory 1602, a processor 1603, a transceiver 1604, and a peripheral device 1601. In addition, as an example, the device 1600 may further include another configuration and is not limited to the above-described embodiment. Herein, for example, the device 1600 may be a mobile user equipment (for example, smart phone, notebook, wearable device, etc.) or a fixed management device (for example, server, PC, etc.).

Specifically, the device 1600 of FIG. 9 may be an exemplary hardware/software architecture like an active device, a passive device, and a tag. Herein, as an example, the memory 1602 may be a non-removable memory or a removable memory. In addition, as an example, the peripheral device 1601 may include a display, a GPS or other peripheral devices and is not limited to the above-described embodiment.

In addition, as an example, the above-described device 1600 may include a communication circuit together with the transceiver 1604 and thus perform communication with an external device.

In addition, as an example, the processor 1603 may be at least one or more of a general purpose processor, a digital signal processor (DSP), a controller, a microcontroller, application specific integrated circuits (ASICs), field programmable gate array (FPGA) circuits, any other types of integrated circuits (ICs), and one or more microprocessors associated with a state machine. That is, it may be a hardware/software configuration that performs a role of controlling the device 1600.

Herein, the processor 1603 may execute computer-executable instructions stored in the memory 1602 for performing various necessary functions of a UWB wireless positioning device. As an example, the processor 1603 may control at least any one operation of signal coding, data processing, power control, input/output processing, and communication. In addition, the processor 1603 may control a physical layer, an MAC layer, and an application layer. In addition, as an example, the processor 1603 may perform an authentication and security procedure in an access layer and/or an application layer and is not limited to the above-described embodiment.

As an example, the processor 1603 may perform communication with other devices through the transceiver 1604. As an example, the processor 1603 may control a UWB wireless positioning device to perform communication with other devices via a network through execution of computer-executable instructions. That is, communication performed in the present disclosure be controlled. As an example, the transceiver 1604 may transmit a RF signal through an antenna and transmit a signal based on various communication networks.

In addition, as an example, an antenna technology such as the MIMO technology, beamforming, and like may be applied and is not limited to the above-described embodiment. In addition, signals transmitted and received through the transceiver 1604 may be modulated and demodulated to be controlled by the processor 1603 and is not limited to the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A non-infrastructure ultra-wideband (UWB) wireless positioning method, comprising:

receiving a ranging message transmitted from other active devices;

obtaining data included in the ranging message and measuring a location of an active device by using the obtained data;

checking a remaining amount of power of the active device and creating a ranging message by using the remaining amount of power of the active device and the obtained data; and transmitting the created ranging message to the other active devices at a preset transmission time, wherein, when a request of device change is received from a first passive device based on a remaining amount of power of at least one passive device overhearing the ranging message and the remaining amount of power of the active device, a response for changing the first passive device to an active device is provided, and the active device itself changes from an active device to a passive device.

2. The non-infrastructure UWB wireless positioning method of claim 1, wherein the creating of the ranging message creates the ranging message including an address of the first passive device so that the first passive device changes to an active, when the request of device change is received first from the first passive device.

3. The non-infrastructure UWB wireless positioning method of claim 1, wherein the measuring of the location of the active device measures the location by additionally considering a transmission order of the ranging message, which is preset for the other active devices and the active device.

4. The non-infrastructure UWB wireless positioning method of claim 1, wherein the measuring of the location of the active device measures the location of the active device by obtaining an address of each of the other active devices, a reception time of the ranging message, and coordinate information of each of the other active devices and by using distance information obtained through ranging with the other active devices and the coordinate information of each of the other active devices.

5. The non-infrastructure UWB wireless positioning method of 1, wherein the receiving receives the ranging message that is transmitted at a transmission time that is preset in each of the other active devices.

6. The non-infrastructure UWB wireless positioning method of 1, wherein each of the other active devices and the active device include a device capable of moving.

7. The non-infrastructure UWB wireless positioning method of claim 1, wherein the measuring of the location of the active device measures the location by using the obtained data of the ranging message that is received through a latency communication technique and a process of ranging with the other active devices.

8. A non-infrastructure ultra-wideband (UWB) wireless positioning method, comprising:

obtaining a ranging message transmitted from each of active devices by using an overhear function;

obtaining positioning necessary data for positioning included in the ranging message;

measuring a location of a passive device by using the positioning necessary data;

creating a message for changing the passive device to an active device, when a remaining amount of power of each of the active devices included in the ranging message and a remaining amount of power of the passive device are compared and a preset condition is satisfied; and transmitting the created message to the active devices, wherein, when the created message is transmitted to the active devices, one active device of the active devices changes to a passive device, and the passive device changes from a passive device to an active device.

9. The non-infrastructure UWB wireless positioning method of claim 8, wherein the measuring of the location of the passive device measures the location of the passive device based on a location of each of the active devices by using a time difference of arrival (TDoA) method.

10. The non-infrastructure UWB wireless positioning method of claim 8, wherein the creating of the message creates the message including an address of the one active device, when there is the one active device with a remaining amount of power that is larger than the remaining amount of power of the passive device by a predetermined amount or more.

11. The non-infrastructure UWB wireless positioning method of claim 8, wherein the creating of the message creates the message including an address of an active device with a largest remaining amount of power, when there are a plurality of active devices with a remaining amount of power that is larger than the remaining amount of power of the passive device by a predetermined amount or more.

12. The non-infrastructure UWB wireless positioning method of claim 8, wherein the creating of the message creates the message including an address and a priority of each of a plurality of active devices, when the plurality of active devices have a remaining amount of power that is larger than the remaining amount of power of the passive device by a predetermined amount or more.

13. A non-infrastructure ultra-wideband (UWB) wireless positioning system, comprising:

active devices that measure their locations through latency communication and a ranging process; and at least one passive device that obtains a ranging message transmitted from each of the active devices by overhearing and measures its own location based on positioning necessary data for positioning included in the ranging message, wherein the passive device compares a remaining amount of power of each of the active devices included in the ranging message and its remaining amount of power of the passive device and, when a preset condition is satisfied, creates a message for changing to an active device and transmits the message to the active devices, so that one active device of the active devices changes to a passive device, and the passive device changes from a passive device to an active device.

14. The non-infrastructure UWB wireless positioning system of claim 13, wherein each of the active devices is configured to:

receive the ranging message transmitted from other active devices, obtain data included in the ranging message, and measure its location by using the obtained data.

15. The non-infrastructure UWB wireless positioning system of claim 14, wherein the each of the active devices measures its location by obtaining an address of each of the other active devices, a reception time of the ranging message, and coordinate information of each of the other active devices, and by using distance information obtained through ranging with the other active devices and the coordinate information of each of the other active devices.

16. The non-infrastructure UWB wireless positioning system of claim 13, wherein the passive device measures its location based on a location of each of the active devices by using a time difference of arrival (TDoA) method.

17. The non-infrastructure UWB wireless positioning system of claim 13, wherein the passive device creates the message including an address of the one active device, when there is the one active device with a remaining amount of power that is larger than the remaining amount of power of the passive device by a predetermined amount or more.

18. The non-infrastructure UWB wireless positioning system of claim 13, wherein the passive device creates the message including an address of an active device with a largest remaining amount of power, when there are a plurality of active devices with a remaining amount of power that is larger than the remaining amount of power of the passive device by a predetermined amount or more.

19. The non-infrastructure UWB wireless positioning system of claim 13, wherein the passive device creates the message including an address and a priority of each of a plurality of active devices, when the plurality of active devices have a remaining amount of power that is larger than the remaining amount of power of the passive device by a predetermined amount or more.

\* \* \* \* \*